United States Patent
Pedersen

(10) Patent No.: US 7,295,850 B2
(45) Date of Patent: Nov. 13, 2007

(54) METHOD AND PACKET RADIO SYSTEM FOR CONTROLLING LINK ADAPTATION

(75) Inventor: Klaus Ingemann Pedersen, Aalborg (DK)

(73) Assignee: Nokia Corporation, Espoo (FI)

( * ) Notice: Subject to any disclaimer, the term of this patent is extended or adjusted under 35 U.S.C. 154(b) by 714 days.

(21) Appl. No.: 10/716,530

(22) Filed: Nov. 20, 2003

(65) Prior Publication Data

US 2005/0070319 A1 Mar. 31, 2005

(30) Foreign Application Priority Data

Sep. 25, 2003 (FI) .................................. 20031383

(51) Int. Cl.
*H04B 1/00* (2006.01)
*H04Q 7/20* (2006.01)

(52) U.S. Cl. .................... 455/515; 455/63.1; 455/452.2

(58) Field of Classification Search ................ 455/450, 455/452.2, 67.11, 63.1, 515
See application file for complete search history.

(56) References Cited

U.S. PATENT DOCUMENTS

| 7,113,782 B2 * | 9/2006 | Lucidarme | ............... | 455/432.1 |
| 2004/0022213 A1 * | 2/2004 | Choi et al. | ................... | 370/332 |
| 2004/0142698 A1 * | 7/2004 | Pietraski | ................ | 455/452.2 |

OTHER PUBLICATIONS

Motorola, Ericsson, Revised CQI proposal Apr. 9-12, 2002, pp. 1-8, see appendix A.*
3GPP TS 25.215 v5.3.0, Mar. 2003, Technical Specification, 3rd Generation Partnership Project; Technical Specification Group Radio Access Network; Physical Layer—Measurements (FDD) (Release 5), pp. 1-18.
3GPP TS 25.212 v5.3.0, Dec. 2002, Technical Specification, 3rd Generation Partnership Project; Technical Specification Group Radio Access Network; Multiplexing and Channel Coding (FDD) (Release 5), pp. 1-74.

* cited by examiner

*Primary Examiner*—Tilahun Gesesse
(74) *Attorney, Agent, or Firm*—Squire Sanders & Dempsey L.L.P.

(57) ABSTRACT

A method of controlling link adaptation in a packet radio system is described, the method comprising receiving (302) a CQI (channel quality indicator) report, the CQI report including the number of parallel multi-codes, the transport block size, TBS, and the modulation scheme to be used in link adaptation; and calculating an effective code rate, ECR, based on the received CQI report. The method comprises calculating (306) new estimates for the effective code rate (ECR) and the transport block size (TBS) based on a ratio of the number of multi-codes of the CQI report and the number of multi-codes that the packet radio system has available for transmission, and executing (308) link adaptation based on the new estimates for the effective code rate (ECR) and the transport block size (TBS).

17 Claims, 2 Drawing Sheets

Fig. 1
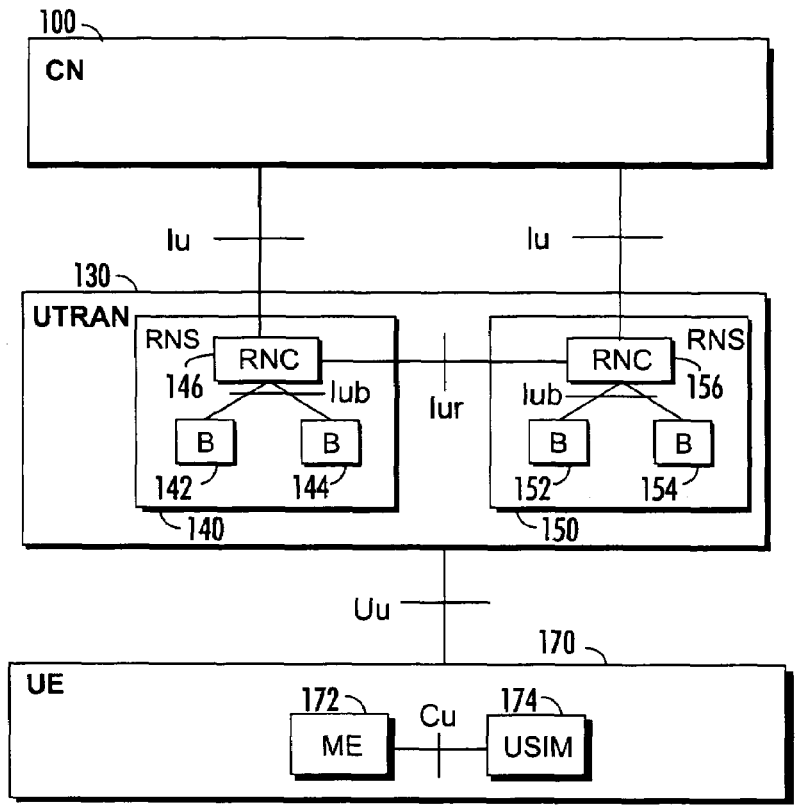
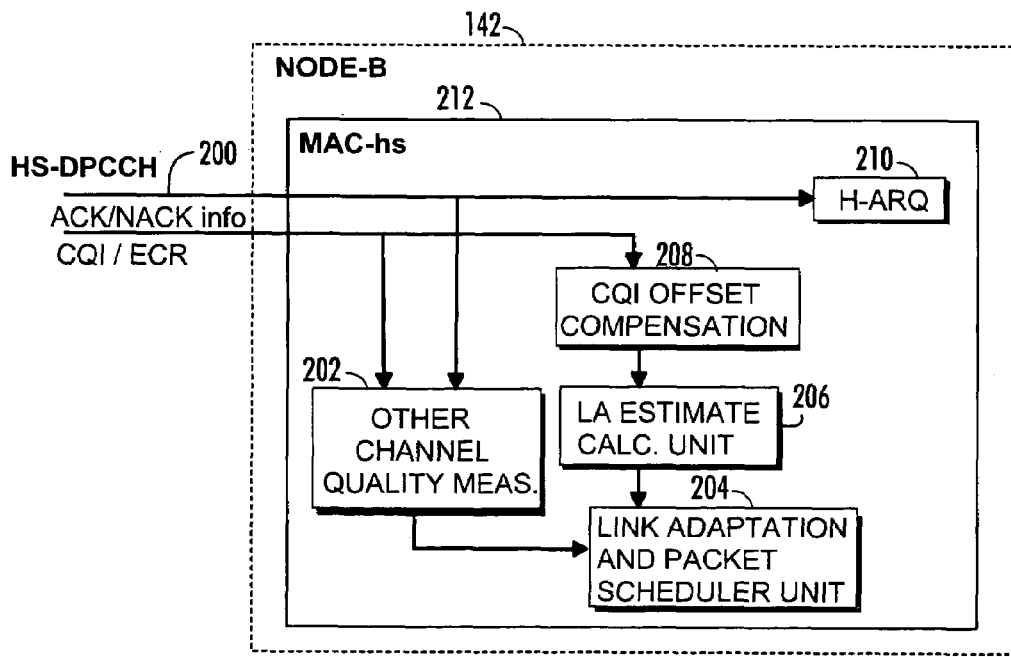
Fig. 2

METHOD AND PACKET RADIO SYSTEM FOR CONTROLLING LINK ADAPTATION

FIELD

The invention relates to packet radio systems. More precisely, it relates to controlling link adaptation in an HSDPA (High Speed Downlink Packet Access) radio system.

BACKGROUND

In the ongoing standardisation work in WCDMA (Wideband Code Division Multiple Access) evolution in 3GPP (3rd Generation Partnership Project), a new concept called HSDPA (high speed downlink packet access) has been introduced for Release 5. The transport channel of HSDPA supports fast link adaptation (LA) where the bit rate is varied in each transmission time interval (TTI). The bit rate is varied by mapping the transport channel into a variable number of parallel multi-codes with a variable effective code rate (ECR). Mapping is performed by using a QPSK (quadrature phase shift keying) or 16QAM (16-quadrature amplitude) modulation. For link adaptation purposes, user equipment (UE) may periodically transmit a channel quality indicator (CQI) report to the network. The CQI report recommends the transport block size (TBS) to be used during the next transmission time interval as well as the modulation scheme and the number of parallel multi-codes. The CQI report is described in $3^{rd}$ Generation Partnership Project; 3GPP Specification 25.215, Version 5.3.0. However, it is possible that the CQI report, transmitted by the user equipment, may suggest using a higher number of multi-codes than the network has available for HSDPA transmission. In such cases, the CQI report would not directly be applicable. These situations may take place, for example, if there are only 5 multi-codes reserved at the network for HSDPA transmission and at the same time, the CQI report from the user equipment suggests using 11 multi-codes. Situations like this are very likely to occur in real networks. Thus, the CQI report cannot directly be used in the above-described situations. There is a need for a solution that gives a robust and spectrally efficient link adaptation estimate also when using the CQI report in situations described above.

BRIEF DESCRIPTION OF THE INVENTION

An object of the invention is to provide an improved method and a packet radio system for controlling link adaptation. According to an aspect of the invention, there is provided a method of controlling link adaptation in a packet radio system, the method comprising receiving a CQI (channel quality indicator) report, the CQI report including the number of parallel multi-codes, the transport block size, TBS, and the modulation scheme to be used in link adaptation; and calculating an effective code rate, ECR, based on the received CQI report. The method comprises, when the number of parallel multi-codes of the CQI report exceeds the number of multi-codes available for transmission: calculating new estimates for the effective code rate, ECR, and the transport block size, TBS, based on a ratio of the number of multi-codes of the CQI report and the number of multi-codes available for transmission, and executing link adaptation based on the new estimates for the effective code rate, ECR, and the transport block size, TBS.

According to another aspect of the invention, there is provided a packet radio system, the packet radio system being configured to: receive a channel quality indicator (CQI) report including the number of parallel multi-codes, the transport block size, TBS, and the modulation scheme to be used in calculating a link adaptation estimate, and calculate an effective code rate, ECR. When the number of parallel multi-codes of the CQI report exceeds the number of multi-codes that the packet radio system has available for transmission, the packet radio system is further configured to calculate new estimates for the effective code rate, ECR, and the transport block size, TBS, based on a ratio of the number of multi-codes of the CQI report and the number of multi-codes that the packet radio system has available for transmission, and execute link adaptation based on the new estimates for the effective code rate, ECR, and the transport block size, TBS.

The method and base station of the invention provide several advantages. The CQI report may be used even in situations where the CQI report as such is not directly applicable. Also, in these cases a robust and spectrally efficient link adaptation estimate is obtained.

LIST OF DRAWINGS

In the following, the invention will be described in greater detail with reference to the preferred embodiments and the accompanying drawings, in which FIG. 1 is a simplified block diagram illustrating the structure of a radio system;

FIG. 2 shows a simplified outline of an embodiment of the present invention;

DESCRIPTION OF EMBODIMENTS

Figure 3:
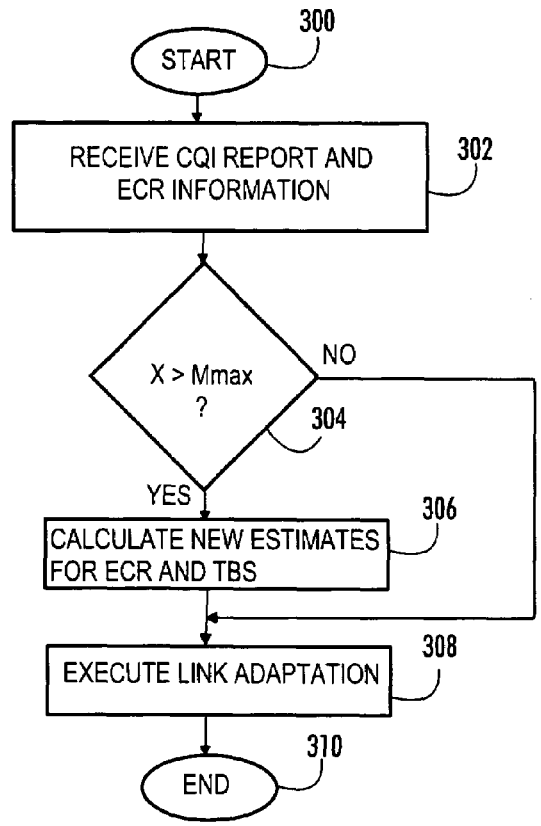
FIG. 3 shows an embodiment of the method of controlling link adaptation in a radio system.

With reference to FIG. 1, let us examine an example of a radio system in which the preferred embodiments of the invention can be applied. A radio system in FIG. 1, known at least as UMTS (Universal Mobile Telecommunications System) and IMT-2000 (International Mobile Telecommunications 2000), represents the third-generation radio systems. The embodiments are, however, not restricted to these systems described by way of example, but a person skilled in the art can also apply the instructions to other radio systems containing corresponding characteristics.

FIG. 1 is a simplified block diagram, which shows the most important parts of a radio system and the interfaces between them at network-element level. The structure and functions of the network elements are not described in detail, because they are generally known.

The main parts of a radio system are a core network (CN) 100, a radio access network 130 and user equipment (UE) 170. The term UTRAN is short for UMTS Terrestrial Radio Access Network, i.e. the radio access network 130 belongs to the third generation and is implemented by wideband code division multiple access (WCDMA) technology. The main elements of the UTRAN are radio network controller (RNC) 146, 156, Node-Bs 142, 144, 152, 154 and user equipment 170. The UTRAN is attached to the existing GSM core network 100 via an interface, called Iu. This interface is supported by the RNC 146, 156, which manages a set of base stations called Node-Bs 142, 144, 152, 154 through interfaces called Iub. The UTRAN is largely autonomous from the core network 100 since the RNCs 146, 156 are interconnected by the Iur interface.

On a general level, the radio system can also be defined to comprise user equipment, which is also known as a subscriber terminal and mobile phone, for instance, and a network part, which comprises the fixed infrastructure of the radio system, i.e. the core network, radio access network and base station system.

From the point of view of Node-B 142, 144, 152, 154, i.e. base station, there is one controlling RNC 146, 156, where its Iub interface terminates. The controlling RNC 146, 156 also takes care of admission control for new mobiles or services attempting to use the Node-B 142, 144, 152, 154. The controlling RNC 146, 156 and its Node-Bs 142, 144, 152, 154 form an RNS (Radio Network Subsystem) 140, 150.

The user equipment 170 may comprise mobile equipment (ME) 172 and UMTS subscriber identity module (USIM) 174. USIM 174 contains information related to the user and information related to information security in particular, for instance, an encryption algorithm.

In UMTS networks, the user equipment 170 can be simultaneously connected to a plurality of Node-Bs in occurrence of soft handover.

From the user equipment 170 point of view there is a serving RNC 146, 156 that terminates the mobiles link layer communications. From the CN 100 point of view, the serving RNC 146, 156 terminates the Iu for this user equipment 170. The serving RNC 146, 156 also takes care of admission control for new mobiles or services attempting to use the CN 100 over its Iu interface.

In UMTS, the most important interfaces between network elements are the Iu interface between the CU 100 and the radio access network 130, which is divided into the interface IuCS on the circuit-switched side and the interface IuPS on the packet-switched side, and the Uu interface between the radio access network and the user equipment.

The HSDPA (High Speed Downlink Packet Access) concept has been introduced to increase packet data throughput by means of fast physical layer retransmission and transmission combining as well as fast link adaptation controlled by the Node-B. In HSDPA, the link adaptation decisions are performed in the Node-B. The HS-DPCCH (High Speed-Dedicated Physical Control Channel) is used in HSDPA for providing feedback information from the user equipment 170 to the Node-B. The HS-DPCCH carries the necessary control information in the uplink, that is, ARQ acknowledgements (both positive and negative) and downlink quality feedback information. Thus, the HS-DPCCH channel may carry H-ARQ information (ACK/NACK) and channel quality indicator (CQI) information bits. The HS-DPCCH channel mapping and coding of these information parts are described in the 3rd Generation Partnership Project; Technical Specification Group Radio Access Network; Multiplexing and channel coding (FDD) (Release 5) 3GPP TS 25.212 v5.3.0(2002-12).

The user equipment (170) sends a CQI (channel quality indicator) report regularly over a control channel to the Node-B. The CQI report includes the number of parallel multi-codes, the transport block size (TBS) and the modulation scheme to be used in calculating link adaptation estimates and also information on a relative energy per symbol to noise ratio (EsNo) and an effective code rate (ECR). However, it is possible that the number of parallel multi-codes of the CQI report exceeds the number of multi-codes that the Node-B has available for transmission. In an embodiment, the Node-B is configured to calculate new estimates for the effective code rate (ECR) and the transport block size (TBS) based on a ratio of the number of multi-codes of the CQI report and the number of multi-codes that the Node-B has available for transmission, when the number of parallel multi-codes of the CQI report exceeds the number of multi-codes that the Node-B has available for transmission. After that, the link adaptation may be executed in the Node-B based on the new estimates for the effective code rate (ECR) and the transport block size (TBS).

FIG. 2 shows a simplified outline of an embodiment of the present invention. The HSDPA-related MAC functionality is included in a unit called MAC-hs 212 located in the Node-B 142. The transport channel 200 may be a high speed downlink shared channel (HS-DSCH), for example, and the MAC-hs 212 controls it. The MAC-hs 212 is responsible for handling the data transmitted on the transport channel 200. The Node-B 142 may also comprise the following elements: a link adaptation and packet scheduler unit 204, a link adaptation estimate calculation unit 206, a means for compensating CQI offset 208, a H-ARQ manager 210 and a unit for other channel quality measurements 202, for example. The MAC-hs 212 may be carried out as a software implementation, which is run on a DSP (digital signal processor) or a microprocessor, for example.

The link adaptation estimates related to the CQI report may be calculated in the link adaptation estimate calculation unit 206 and the link adaptation may be executed in the link adaptation unit 204 based on the calculated link adaptation estimates. The CQI report includes the number of parallel multi-codes, the transport block size (TBS) and the modulation scheme to be used in link adaptation. The effective code rate (ECR) may be calculated based on the CQI report.

When the Node-B 142 has reserved less multi-codes for HSDPA transmission than the CQI report is suggesting to be used, then the CQI report must be mapped into a feasible link adaptation estimate where the maximum number of multi-codes that the Node-B has reserved is used. Thus, according to an embodiment of the invention, the Node-B 142 is configured to calculate new estimates for the effective code rate (ECR) and the transport block size (TBS) based on a ratio of the number of multi-codes of the CQI report and the number of multi-codes that the Node-B has available for transmission, and to execute link adaptation based on the new estimates for the effective code rate (ECR) and the transport block size (TBS).

FIG. 3 shows an embodiment of the method of controlling link adaptation in a packet radio system. The method starts in 300. In 302, a CQI (channel quality indicator) report from user equipment over a control channel is received in the Node-B. The CQI report includes the number of parallel multi-codes, the transport block size (TBS) and the modulation scheme to be used in link adaptation. From this information the effective code rate (ECR) may be calculated. Also the relative required energy per symbol to noise ratio (EsNo) between different ECR is known.

Let us assume that the proposed number of multi-codes by the CQI report equals X and the Node-B has only reserved Mmax multi-codes for HSDPA transmission. Assuming that X is greater than Mmax (X>Mmax), the optimal link adaptation setting from a spectral efficiency point of view is to transmit with M equals Mmax (M=Mmax) multi-codes. Since the transmission for HSDPA is performed With a fixed power level, the transmit power per multi-codes is increased as compared to the case where X multi-codes would be transmitted. This basically means that the effective energy per symbol to noise ratio (EsNo) per multi-code is increased by an increase factor $\beta$. The increase factor is calculated by taking a logarithm of the ratio between the number of multi-codes by the CQI report and the maximum number of multi-codes that the Node-B has available for HSDPA transmission and multiplying the result by the number of ten by using formula (1):

$$\beta = 10 * \log_{10}\left(\frac{X}{M\max}\right) \quad (1)$$

where:
β is the increase factor,
X is the number of multi-codes by the CQI report and
Mmax is the number of multi-codes the Node-B has available.

In 304, it is detected whether the number of multi-codes proposed by the CQI report exceeds the number of multi-codes that the base-station has reserved for transmission. That being the case 306 is entered where new estimates for ECR and TBS are calculated. The new estimate for the effective code rate (ECR) may be calculated based on the calculated increase factor β and the effective code rate (ECR) by the CQI report. The increased EsNo per multi-code may be exploited to increase the ECR and/or increase the modulation order if the recommended modulation scheme by the CQI report equals QPSK. If the recommended modulation scheme by the CQI report equals 16 QAM, then the selected modulation scheme should be 16 QAM with a higher ECR corresponding to the increased EsNo per multi-code. The equivalent ECR proposed by the CQI report can be calculated by using formula (2):

$$ECR_{CQI} = \frac{TBS_{CQI}}{(X*W)} \quad (2)$$

where:
$ECR_{CQI}$ is the effective code rate (ECR) by the CQI report,
$TBS_{CQI}$ is the transport block size (TBS) by the CQI report,
X is the number of multi-codes by the CQI report and
W is the number of bits per transmission time interval (TTI) for each multi-code.

The number of bits per transmission time interval (TTI) for each multi-code (W) can be calculated by using formula (3):

$$W = 2560*3*Q/SF \quad (3)$$

where:
Q is the number of bits per symbol, i.e., Q=2 for QPSK and Q=4 for 16 QAM, and
SF is the spreading factor for the high-speed physical downlink shared channel (HS-PDSCH), here SF=16.

The increased EsNo per multi-code may be used to further increase the equivalent bit rate to an equivalent new estimate for ECR. Thus, the recommended new estimate for the TBS for the link adaptation unit may be calculated using formula (4):

$$TBS = \text{Round}\{ECR_{NEW} * W * M\max\} \quad (4)$$

where:
Round{} denotes quantization to the nearest possible TBS.

Figure 4A:
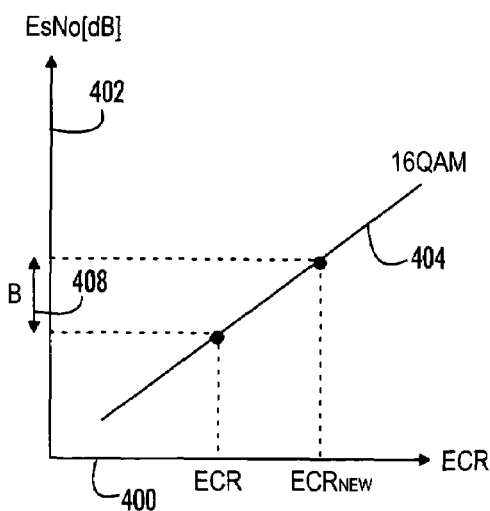
FIGS. 4A and 4B show examples of sketches of relative EsNo and ECR for 16QAM and QPSK modulation.

The new estimate for the ECR can be obtained as a function of β and ECR by the CQI report, when the radio system has a table with the relative required EsNo versus the ECR. This is illustrated in FIG. 4A. FIG. 4A shows a sketch of relative required EsNo and ECR for 16 QAM modulation and how to obtain the value of the new estimate for the ECR from the ECR and the β. In FIG. 4A, the x-axis 400 shows the effective code rate (ECR) and the y-axis 402 shows the energy to symbol to noise ratio (EsNo). The graph 404 illustrates the 16 QAM modulation scheme. On the x-axis of FIG. 4A, the value of the ECR by the CQI report is shown. Based on the value of the ECR in relation to the 16 QAM graph 404, equivalent value of EsNo on the y-axis is found. The value of the EsNo is increased by the magnitude of the increase factor β 408. The new estimate for the ECR is found based on the increased EsNo in relation to the ECR for the 16 QAM modulation. The example of the value of the new estimate ($ECR_{NEW}$) for the ECR is shown on the x-axis of FIG. 4A.

Figure 4B:
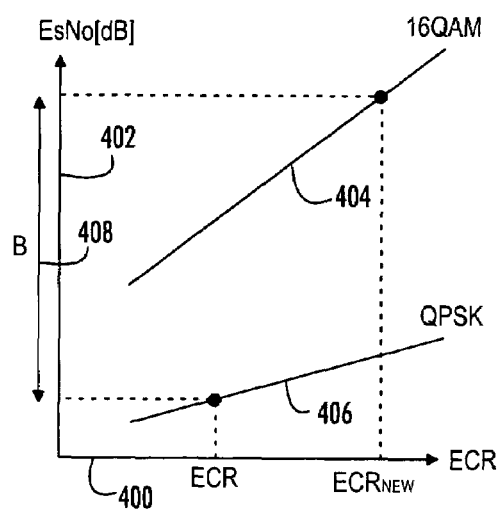

If the recommended modulation scheme by the CQI report equals QPSK, then the same principle as described above may be used to estimate the new estimate for the ECR. However, if the number of multi-codes that the Node-B has reserved for transmission is smaller than the number of multi-codes by the CQI report (Mmax<<X), the dynamic range offered by the variable ECR may not necessary be sufficiently large to fully exploit the increase of EsNo. Thus, in an embodiment, the Node-B may select to use 16 QAM modulation scheme with a given new estimate for the ECR. This situation is illustrated in FIG. 4B, where QPSK modulation is recommended by the CQI report and 16 QAM modulation with the new estimate for the ECR is selected due to the high value of β. In FIG. 4B, the x-axis 400 shows the effective code rate (ECR) and the y-axis shows the energy to symbol to noise ratio (EsNo). The graph 404 illustrates the 16 QAM modulation scheme and the graph 406 illustrates the QPSK modulation scheme. The QPSK modulation scheme is recommended by the CQI report. Thus, based on the value of the ECR in relation to the QPSK graph 406, equivalent value of EsNo on the y-axis is found. As is the situation illustrated in FIG. 4A, the value of the EsNo is increased by the magnitude of the increase factor β. Since the new value of the EsNo is so high, the 16 QAM modulation scheme is selected in obtaining the new estimate for the ECR ($ECR_{NEW}$).

Although the FIG. 4B shows an example where the new estimate for ECR is higher than the ECR by the CQI report, it is also possible that the new estimate for the ECR is smaller than the ECR by the CQI report, if the value of the increase factor β is smaller than the value used in this example.

Returning to the exemplary method of FIG. 3, after the new estimates for ECR and TBS have been calculated based on a ratio of the number of multi-codes of the CQI report and the number of multi-codes that the Node-B has available for transmission, then 308 is entered where the link adaptation is executed based on the new estimates for the effective code rate (ECR) and the transport block size (TBS). The method ends in 310.

Even though the invention is described above with reference to an example according to the accompanying drawings, it is clear that the invention is not restricted thereto but it can be modified in several ways within the scope of the appended claims.

The invention claimed is:

1. A method, comprising:
controlling link adaptation in a packet radio system;
receiving a channel quality indicator report, the channel quality indicator report including a number of parallel multi-codes, a transport block size, and a modulation scheme to be used in link adaptation;

calculating an effective code rate based on the received channel quality indicator report;

when a number of parallel multi-codes of the channel quality indicator report exceeds a number of multi-codes available for transmission calculating new estimates for the effective code rate and the transport block size based on a ratio of the number of multi-codes of the channel quality indicator report and the number of multi-codes available for transmission, and executing link adaptation based on new estimates for the effective code rate and the transport block size.

2. The method of claim 1, further comprising, when calculating the new estimate for the effective code rate:

calculating an increase factor by taking a logarithm of the ratio between the number of multi-codes by the channel quality indicator report and the maximum number of multi-codes available for transmission and multiplying the result by the number of ten; and calculating the new estimate for the effective code rate based on the calculated increase factor and the effective code rate of the channel quality indicator report.

3. The method of claim 2, further comprising:

forming a table with the function of an energy to symbol to noise ratio and the effective code rate; and obtaining the new estimate for the effective code rate based on the table with the function of the energy per symbol to noise ratio and the effective code rate, the increase factor and the modulation scheme.

4. The method of claim 1, further comprising, when calculating the new estimate for the transport block size:

quantizing the product between the new estimate for the effective code rate, a number of bits per transmission time interval for each multi-code, and the maximum number of multi-codes that the base station has available for transmission, to the nearest possible transport block size.

5. The method of claim 1, further comprising:

calculating the effective code rate proposed by the channel quality indicator report based on the ratio of the transport block size of the channel quality indicator report to a product of the number of multi-codes and the number of bits per transport time interval for each multi-block.

6. The method of claim 1, further comprising:

selecting the modulation scheme to be used in link adaptation based on the received channel quality indicator report, the modulation scheme being quadrature phase shift keying or 16-quadrature amplitude modulation scheme.

7. The method of claim 6, further comprising:

selecting the 16-quadrature amplitude modulation scheme, when the number of multi-codes that the base station has available for transmission is smaller than the number of multi-codes of the channel quality indicator report.

8. The method of claim 1, further comprising:

configuring the packet radio system to be a high speed downlink packet access radio system.

9. A packet radio system, configured to:

receive a channel quality indicator report including the number of parallel multi-codes, the transport block size, and the modulation scheme to be used in calculating a link adaptation estimate;

calculate an effective code rate;

calculate new estimates for the effective code rate and the transport block size based on a ratio of the number of multi-codes of the channel quality indicator report and the number of multi-codes that the packet radio system has available for transmission, when the number of parallel multi-codes of the channel quality indicator report exceeds the number of multi-codes that the packet radio system has available for transmission; and execute link adaptation based on the new estimates for the effective code rate, and the transport block size.

10. The packet radio system of claim 9, wherein the packet radio system is further configured to:

calculate the new estimate for the effective code rate by calculating an increase factor by taking a logarithm of the ratio between the number of multi-codes by the channel quality indicator report and the maximum number of multi-codes that the packet radio system has available for high speed downlink packet access transmission and multiplying the result by the number of ten, and calculating the new estimate for the effective code rate from a function of the calculated increase factor and the effective code rate of the channel quality indicator report.

11. The packet radio system of claim 10, wherein the packet radio system is further configured to:

form a table with the function of an energy to symbol to noise ratio and the effective code rate; and obtain the new estimate for the effective code rate based on the table with the function of the energy per symbol to noise ratio and the effective code rate, the increase factor and the modulation scheme.

12. The packet radio system of claim 9, wherein the packet radio system is further configured to:

calculate the new estimate for the transport block size by quantizing the product between the new estimate for the effective code rate, a number of bits per transmission time interval for each multi-code, and the maximum number of multi-codes that the packet radio system has available for transmission, to the nearest possible transport block size.

13. The packet radio system of claim 9, wherein the effective code rate proposed by the channel quality indicator report is based on a ratio of the transport block size of the channel quality indicator report to a product of the number of multi-codes and the number of bits per transport time interval for each multi-block.

14. The packet radio system of claim 9, wherein the packet radio system is further configured to:

select the modulation scheme to be used in link adaptation based on the received channel quality indicator report and the modulation scheme is one of quadrature phase shift keying and 16-quadrature amplitude modulation scheme.

15. The packet radio system of claim 14, wherein the packet radio system is further configured to:

select the 16-quadrature amplitude modulation scheme, when the number of multi-codes that the base station has available for transmission is smaller than the number of multi-codes of the channel quality indicator report.

16. The packet radio system of claim 9, wherein the packet radio system is a high speed downlink packet access radio system.

17. A packet radio system, comprising:

receiving means for receiving a channel quality indicator report, the channel quality indicator report including a number of parallel multi-codes, a transport block size, and a modulation scheme to be used in link adaptation;

first calculating means for calculating an effective code rate based on the received channel quality indicator report;

second calculating means for calculating new estimates for the effective code rate when the number of parallel multi-codes of the channel quality indicator report exceeds a number of parallel multi-codes available for transmission; and executing means for executing link adaptation when the number of parallel multi-codes of the channel quality indicator report exceeds a number of parallel multi-codes available for transmission, based on new estimates for the effective code rate and the transport block size.

* * * * *